United States Patent
Köffers et al.

(10) Patent No.: US 12,466,141 B2
(45) Date of Patent: Nov. 11, 2025

(54) METHOD OF PRESTRESSING THE MEMBRANE OF A MEMBRANE PRESS AND PRESS FOR CARRYING OUT THIS METHOD

(71) Applicant: Siempelkamp Maschinen- und Anlagenbau GmbH, Krefeld (DE)

(72) Inventors: Fabian Köffers, Krefeld (DE); Michael Schöler, Rheurdt (DE); Klaus Schürmann, Juchen (DE); Lothar Sebastian, Duisburg (DE)

(73) Assignee: Siempelkamp Maschinen- und Anlagenbau GmbH, Krefeld (DE)

( * ) Notice: Subject to any disclaimer, the term of this patent is extended or adjusted under 35 U.S.C. 154(b) by 391 days.

(21) Appl. No.: 17/636,960

(22) PCT Filed: Jul. 28, 2020

(86) PCT No.: PCT/EP2020/071239
§ 371 (c)(1),
(2) Date: Feb. 21, 2022

(87) PCT Pub. No.: WO2021/032416
PCT Pub. Date: Feb. 25, 2021

(65) Prior Publication Data
US 2022/0363021 A1 Nov. 17, 2022

(30) Foreign Application Priority Data
Aug. 22, 2019 (DE) .................... 10 2019 005 916.6

(51) Int. Cl.
*B29C 70/46* (2006.01)
*B30B 5/02* (2006.01)

(52) U.S. Cl.
CPC ................ *B29C 70/46* (2013.01); *B30B 5/02* (2013.01)

(58) Field of Classification Search
CPC . B29C 70/44; B29C 70/46; B29C 2043/3649; B30B 5/02; B30B 5/062; B30B 9/22
See application file for complete search history.

(56) References Cited

U.S. PATENT DOCUMENTS 4,658,618 A * 4/1987 Hellgren .................. B30B 5/02
425/389
5,378,134 A * 1/1995 Blot ........................ B29C 33/04
425/389

(Continued)

FOREIGN PATENT DOCUMENTS

CA 2596808 A1 2/2008
DE 3017273 A1 11/1981

(Continued)

*Primary Examiner* — Jerzi H Moreno Hernandez
(74) *Attorney, Agent, or Firm* — The Webb Law Firm (57) ABSTRACT

A method for pretensioning the membrane of a press, a) providing a press having a first pressing tool, a second pressing tool and a membrane, the first pressing tool and the second pressing tool are movable, the membrane connected to one of the pressing tools, a cavity for a working medium is formed between the membrane and the pressing tool, the cavity is sealed by at least one seal which presses onto the membrane with a sealing force; b) providing at least one workpiece including a matrix and fibres embedded therein; c) inserting the workpiece into the press; d) closing the press; e) subjecting the workpiece to pressure and/or to heat by means of the membrane, a cured shaped part is formed from the workpiece; and f) opening the press and removing the shaped part, which ensures a surface of the membrane is smooth.

14 Claims, 8 Drawing Sheets

(56) References Cited

U.S. PATENT DOCUMENTS

| | | | |
|---|---|---|---|
| 5,427,518 A * | 6/1995 | Morizot | B29C 70/38 |
| | | | 100/211 |
| 8,748,201 B2 | 6/2014 | Preuss et al. | |
| 2004/0055480 A1 | 3/2004 | Hellgren | |
| 2004/0241273 A1* | 12/2004 | Hermann | B29C 43/361 |
| | | | 425/389 |
| 2006/0075796 A1 | 4/2006 | Hellgren | |
| 2008/0053609 A1 | 3/2008 | Renz | |
| 2009/0324768 A1 | 12/2009 | Strebel et al. | |
| 2010/0051195 A1 | 3/2010 | Damm | |
| 2010/0288442 A1 | 11/2010 | Damm | |
| 2011/0146916 A1 | 6/2011 | Zahnd et al. | |
| 2013/0341816 A1* | 12/2013 | Bergmann | B29C 51/085 |
| | | | 264/314 |
| 2016/0297153 A1 | 10/2016 | Henrio et al. | |
| 2017/0341310 A1* | 11/2017 | Thattai Parthasarathy | |
| | | | B29C 70/342 |
| 2019/0030838 A1* | 1/2019 | Drees | B30B 15/048 |
| 2024/0316834 A1* | 9/2024 | Köffers | B29C 70/44 |

FOREIGN PATENT DOCUMENTS

| | | |
|---|---|---|
| DE | 102004025704 A1 | 12/2005 |
| DE | 102004033540 A1 | 1/2006 |
| DE | 102010034923 A1 | 2/2012 |
| DE | 102016101638 A1 | 3/2017 |
| DE | 102016101631 A1 | 8/2017 |
| DE | 102017113595 A1 | 12/2018 |
| EP | 0245762 A1 | 11/1987 |
| EP | 2082866 A2 | 7/2009 |
| EP | 2251188 A2 | 11/2010 |
| GB | 2005189 A | 4/1979 |
| WO | 2006128699 A2 | 12/2006 |
| WO | 2017129395 A1 | 3/2017 |

\* cited by examiner

METHOD OF PRESTRESSING THE MEMBRANE OF A MEMBRANE PRESS AND PRESS FOR CARRYING OUT THIS METHOD

CROSS-REFERENCE TO RELATED APPLICATIONS

This application is the United States national phase of International Application No. PCT/EP2020/071239 filed Jul. 28, 2020, and claims priority to German Patent Application No. 10 2019 005 916.6 filed Aug. 22, 2019, the disclosures of which are hereby incorporated by reference in their entirety.

BACKGROUND OF THE INVENTION

Field of the Invention

The invention relates to a method for prestressing the membrane of a press, comprising the following steps: a) providing a press with a first pressing tool, a second pressing tool, and a membrane, wherein the first pressing tool and the second pressing tool can be moved relative to one another, wherein the membrane is connected to one of the pressing tools, wherein a cavity for a working medium is formed between the membrane and the pressing tool connected to it, and wherein the cavity is sealed by at least one seal, which presses on the membrane with a sealing force, b) providing at least one workpiece, wherein the workpiece has a matrix and fibres inserted therein, c) inserting the workpiece into the press, d) closing the press, e) applying pressure and/or temperature to the workpiece by means of the membrane, wherein a hardened moulded part is formed from the workpiece, and f) opening and removing the moulded part.

Description of Related Art

The invention further relates to a press for carrying out this method, comprising: a first pressing tool, a second pressing tool, and a membrane, wherein the first pressing tool and the second pressing tool can be moved relative to one another, wherein the membrane is connected to one of the pressing tools, wherein a cavity for a working medium is formed between the membrane and the pressing tool connected to it, and wherein the cavity is sealed by at least one seal, which presses on the membrane with a sealing force.

Fibre composite materials are composite materials that consist substantially of two main components: reinforcing fibres and a plastic in which the fibres are embedded ("matrix" or "resin"). By combining the two main components, it can be achieved that the composite material as a whole has better properties than the two components alone. For example, due to their high tensile strength in the direction of the fibre, the fibres help to increase the tensile strength of the composite material. The matrix, on the other hand, ensures, for example, that the fibres are held in their position and are protected from mechanical and chemical influences.

One of several options for the manufacture of components from fibre composite materials is based on the use of prefabricated fibre-resin semi-finished products (so-called "prepregs", abbreviation of "preimpregnated fibres"). In the case of such semi-finished products, the fibres are provided with a resin system that has not yet reacted completely, so that the semi-finished products are still available in a flexible form (e.g. web-shaped, on rollers). The prepregs are only formed when the parts are manufactured and hardened at high pressure and high temperatures by completing the chemical reaction. This step can be done in a press, for example.

For example, prepregs are processed in large quantities in the aviation industry. A challenge in processing is that the aerospace industry often requires very complex part geometries, for example due to reinforcement elements such as stringers. In addition, the assembly work should be reduced, which should be achieved by using fewer, but larger parts. The combination of complex geometries and large part dimensions places increased demands on devices and processes for the manufacture of these parts. One requirement, for example, is to ensure uniform pressurisation during the manufacture of the parts.

A device and a method for manufacturing parts from fibre composite material are for example known from DE 10 2017 113 595 A1. Uniform pressurisation of the part to be manufactured should be achieved by a flexible membrane acting on the part, wherein an oil pressure acts on the membrane from the side of the membrane facing away from the part.

The membrane is therefore pressed onto the part surface by an oil pressure. In this manner, it should also be ensured in the case of curved part surfaces that the oil pressure acts on all sides and thus the force acting from the membrane on the part surface is the same at all points, in particular also the force component acting orthogonally on the part surface.

The use of such a "membrane press" for manufacturing parts from fibre composite material is also known from US 2016/0297153 A1.

One challenge of using a membrane is that, during the entire manufacturing process, the membrane must have a surface that is as smooth as possible in order to ensure a uniform transfer of pressure to the part surface. At the same time, the membrane must be reliably sealed against the cavity in which the oil pressure is built up, but still be mounted in a movable manner in order to maintain its smooth surface even during heat-induced expansion or contraction.

SUMMARY OF THE INVENTION

Against this background, the object underlying the invention is to ensure the smoothest possible membrane surface when manufacturing moulded parts from fibre composite material with a membrane press, taking into account the requirements for sealing and the movable support of the membrane.

This object is achieved in a method in that the membrane is already prestressed before step e).

The method according to the invention is a method for prestressing the membrane of a press. The method first comprises the step of providing a so-called "membrane press". The press comprises a first, for example upper, pressing tool, a second, for example lower, pressing tool and a membrane. The membrane can for example be formed by a thin metal sheet. The first pressing tool and the second pressing tool can be moved relative to one another so that the press can be opened and closed. The membrane is connected to one of the two pressing tools, wherein a cavity for a working medium is formed between the membrane and the pressing tool connected to it. The cavity is designed to absorb a working medium—for example a gas or a liquid. The membrane and the pressing tool connected to it are therefore connected to one another in a gas-tight and/or liquid-tight manner. When the press is closed, the volume of the working space can be changed by moving the membrane, i.e. it can be enlarged or reduced. The cavity is sealed by at least one seal, which presses on the membrane with a sealing force. The seal can for example be a graphite seal, which preferably has a wire mesh.

The method according to the invention also comprises the step of providing at least one workpiece, wherein the workpiece has a matrix and fibres inserted therein. The fibres inserted in the matrix can for example be carbon fibres, glass fibres, aramid fibres or the like. The fibres can be used, for example, as semi-finished products in the form of mats, nonwovens, fabrics, woven fabrics or knitted fabrics. The matrix or resin can for example be formed from thermoplastic plastic. The workpiece can be already finished "fibre matrix semi-finished products", which are also referred to as "prepregs".

The further steps of the method according to the invention are inserting the workpiece into the press (in particular in its working space), closing the press, applying pressure and/or temperature to the workpiece by means of the membrane, wherein a hardened moulded part is formed from the workpiece, and opening the press and removing the moulded part.

According to the invention, the membrane is already prestressed before step e). In other words, the membrane should already have a prestressing before pressure and/or temperature is applied to the workpiece, in particular before the working medium in the cavity is pressurised and/or heated. Since the membrane should already be stressed before the effect of pressure and/or temperature, this stressing is also referred to as prestressing. The membrane preferably has a prestressing, wherein a surface pressure is generated on the seal, which is large enough to reliably seal the cavity. The resulting frictional force is still low enough to allow the membrane to move via the prestressing. Preferably, the prestressing force is greater than the frictional force of the seal acting on the membrane, as otherwise no reliable prestressing of the membrane can be achieved if the prestressing force outside the seal acts on the membrane. The prestressing ensures that the membrane already has a smooth surface at the beginning of the action on the workpiece and is not put under stress only by the working medium in the cavity and is thus "smoothly pulled". This has the advantage that the membrane is applied evenly to the workpiece at the beginning of the temperature and pressure application. Previously known solutions, on the other hand, do not require prestressing of the membrane in order to enable the most flexible possible adaptation of the membrane to the shape of the workpiece surface.

In a particularly simple configuration, the membrane can be permanently prestressed, at the latest as soon as the membrane is placed on the workpiece. If a curved workpiece is to be produced, it is preferable for the membrane to have a smaller arc dimension than the workpiece to be produced.

According to one configuration of the method, during step e) the pressure and/or the temperature of the working medium in the cavity is changed.

By changing the pressure and/or temperature of the working medium in the cavity, the pressure acting on the workpiece and the temperature acting on the workpiece can also be changed, since both the pressure and the temperature of the working medium are transferred to the workpiece via the membrane. Since both the pressure and the temperature can be changed, it is possible to provide changing pressure and temperature profiles instead of a constant pressure and a constant temperature, for example first an increase in pressure and temperature, then holding constant the pressure and temperature and finally a decrease in pressure and temperature. A change in the pressure of the working medium is made possible, for example by a change in the quantity of the working medium in the cavity due to inflow or outflow of working medium. A change in the temperature of the working medium, on the other hand, can be achieved, for example, by the working medium being circulated and the inflowing working medium having a higher or lower temperature than the working medium in the cavity and thus heating or cooling it. Alternatively, a change in the temperature of the working medium in the cavity can also be achieved by the working medium being temperature-regulated by the tool and/or workpiece.

According to a further configuration of the method, in step e), the pressure of the working medium in the cavity is increased to a maximum pressure in the range between 5 bar and 50 bar, in particular between 10 bar and 30 bar.

Alternatively or additionally to this, according to a further configuration of the method, in step e) the temperature of the working medium in the cavity can be increased to a maximum temperature in the range between 300° C. and 500° C., in particular between 330° C. and 410° C.

The above-mentioned maximum pressures and the above-mentioned maximum temperatures have led to optimal results in the manufacture of moulded parts from fibre composite material. The stated values are maximum values; during manufacture in the press, lower pressure and temperature values are also reached, for example during the warm-up phase and during the cool-down phase.

According to a further configuration of the method, the sealing force is changed during step e).

By changing the sealing force during the application of pressure and/or temperature to the workpiece, it is possible to adapt the effectiveness of the seal to the requirements changing during the method. The needs-based adaptation of the effect of the seal is therefore particularly advantageous, since the two objectives of a particularly good seal (high sealing force) and particularly good mobility of the membrane (low sealing force) cannot be achieved simultaneously and to the maximum extent; there is a conflict of objectives in this respect. One way of resolving such a conflict of objectives is to establish a ranking between the competing objectives; for example, a good seal is defined as the main objective, while good mobility of the membrane is only defined as a secondary objective. By changing the sealing force during the method, it is possible to change the ranking between the competing objectives during the method. For example, at the beginning of the method (e.g. in the heating phase at rising temperatures), the mobility of the membrane can be defined as the main objective because heat-induced expansions of the membrane are to be made possible in this phase. This is achieved by setting a low sealing force. In the further course of the method (e.g. at constant high temperatures and high pressures), on the other hand, the good sealing of the membrane can be defined as the main objective because there is a high risk of leakage in this phase, while heat-induced expansions of the membrane as a result of the approximately constant temperatures hardly occur anymore. This can be achieved by setting a greater sealing force. The adjustability or changeability of the sealing force therefore enables a situation-based and needs-based prioritisation of competing objectives.

In design terms, the changeability of the sealing force can for example be achieved by an actuator acting on the seal, which presses the seal more or less strongly onto the membrane surface.

According to a further configuration of the method, the sealing force is changed depending on the pressure and/or the temperature of the working medium in the cavity.

This includes both a change in the sealing force depending on fixed pressure or temperature values (e.g. exceeding a pressure or temperature limit) and a change in the sealing force depending on rates of change of the pressure and temperature values (e.g. exceeding a certain heating rate). This configuration substantiates the previously described aspect of the changeability of the sealing force by linking the sealing force with the process parameters, pressure and temperature. This has the advantage that the sealing force can be automatically adjusted if the pressure and/or the temperature exceeds or falls below certain limits. For this purpose, the press can for example have a control device and sensors for measuring the pressure and the temperature. A greater sealing force is preferably set at higher pressures than at lower pressures in order to ensure a good seal. Temperature, on the other hand, depends more on the rate of change; in the case of quick increases or quick decreases in temperature, a lower sealing force is preferably set in order not to restrict the movement of the membrane as a result of heat-induced expansion or contraction.

According to a further configuration of the method, at least one first sealing force and a second sealing force different thereto, in particular a greater sealing force, is set.

Specifying two or more constant values for the sealing force makes it easier to control the process. In particular, it is easier to optimally coordinate all process parameters with one another if the sealing force is only changed between a limited number of constant values and cannot assume any value. The changeover between the different values can take place, for example, if certain absolute values or rates of change of pressure and/or temperature are exceeded or not met. For example, a first, lower sealing force can be set below a temperature of 200° C. to 250° C. and a second, greater sealing force can be set above a temperature of 250° C. Alternatively or additionally to this, it can be provided that a first, lower sealing force is set below a pressure of, for example, about 5 bar (cavity pressure) and that a second, greater sealing force is set above this pressure limit.

According to a further configuration of the method, the membrane is manufactured from metal and preferably has a thickness in the range between 0.05 mm and 0.5 mm, in particular between 0.25 mm and 0.4 mm. A membrane of metal, in particular of a steel sheet, has the advantage that, on the one hand, the membrane can transmit high pressures due to the mechanical properties of metal and, on the other hand, it is well suited to heating or cooling the workpiece due to the high thermal conductivity of metal. Pressure transfer is achieved by providing a cavity next to the membrane, which can be filled by a working medium that is as incompressible as possible, for example oil, whereby the membrane deforms and is pressed in the direction of the workpiece. Heating or cooling of the workpiece can be achieved when the working medium in the cavity is heated or cooled. The membrane preferably has a very smooth surface, in particular a surface with an Rz value of 2.5 µm, or of 1.0 µm or even 0.1 µm or less.

The previously described object is achieved with a press according to the preamble of claim 9 by at least one device for changing the prestressing of the membrane.

The device for prestressing the membrane can for example be implemented by a spring with adjustable spring travel or adjustable prestressing. Such a device can be used to set a prestressing of the membrane in order to also be changed, for example in order to adapt the prestressing to the workpieces to be manufactured. The changeability of the prestressing of the membrane allows the advantages already discussed in connection with the method to be achieved.

A configuration of the press is characterised by at least one device for changing the sealing force of the seal.

The changeability of the sealing force can for example be achieved by an actuator acting on the seal, which presses the seal more or less strongly onto the membrane surface. The changeability of the sealing force enables the advantages previously discussed in connection with the method to be achieved. If two or more seals are provided, a device for changing the sealing force is preferably provided on each seal, so that the sealing force on each seal can be adjusted and changed independently of the other seals.

BRIEF DESCRIPTION OF THE DRAWINGS

The invention will be explained in more detail below with reference to a drawing which simply represents a preferred exemplary embodiment, in which is shown.

DESCRIPTION OF THE INVENTION

Figure 1A:
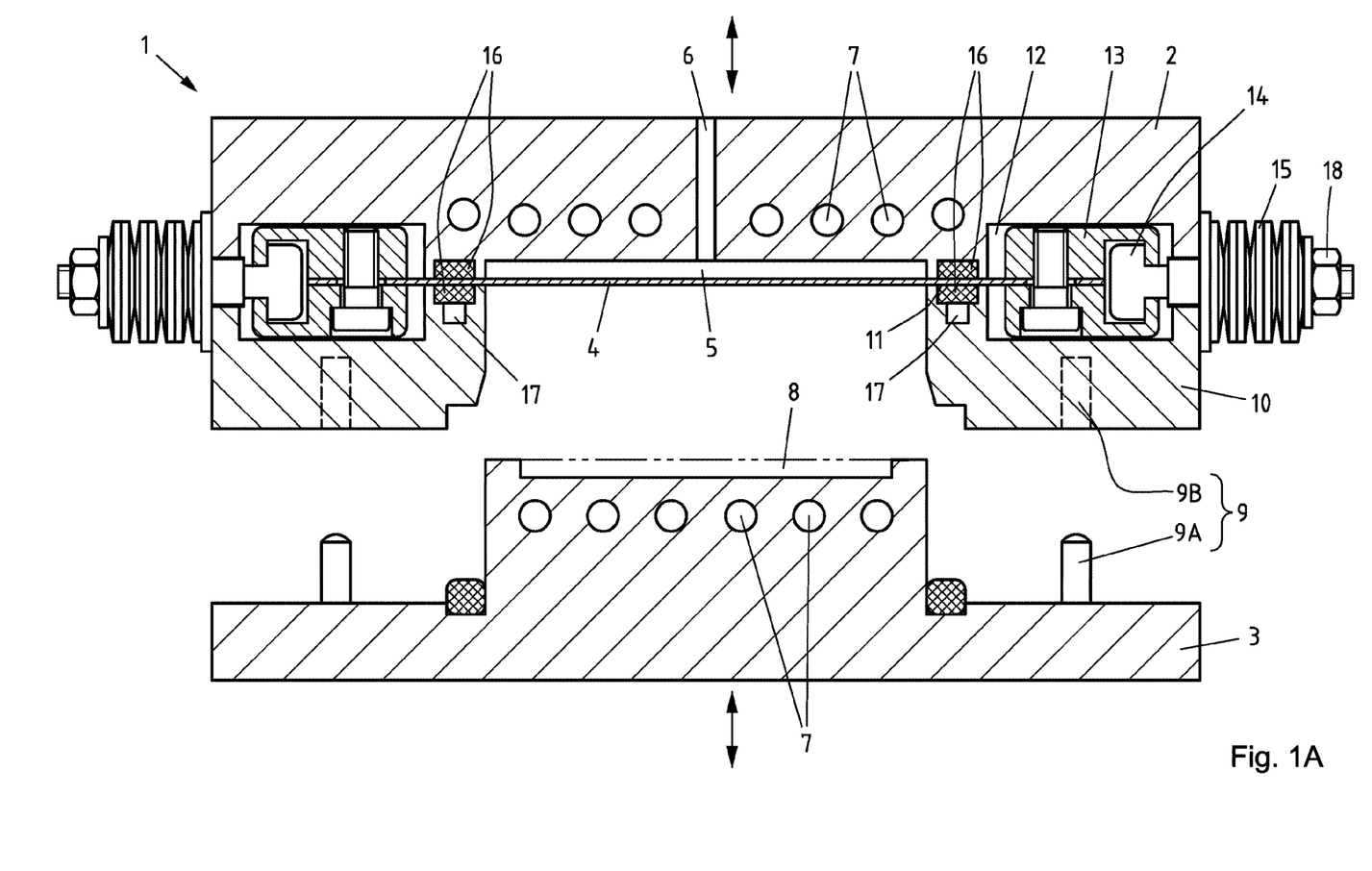
FIG. 1A: a first configuration of a press for carrying out a method according to the invention in the cross-section in the open position without an inserted workpiece.

FIG. 1A shows a first configuration of a press 1 for carrying out a method according to the invention in the cross-section in the open position without an inserted workpiece. The press 1 comprises a first, upper pressing tool 2 and a second, lower pressing tool 3. The two pressing tools 2, 3 can be moved relative to one another, for example in the vertical direction (indicated by arrows in FIG. 1). In addition, the press comprises a membrane 4 which is connected to the upper pressing tool 2. As an alternative to the configuration shown in FIG. 1, the membrane 4 could also be connected to the lower pressing tool 3. A cavity 5 for a working medium, for example oil, is formed between the membrane 4 and the upper pressing tool 2 connected to it. The membrane 4 is manufactured from metal and preferably has a thickness in the range between 0.05 mm and 0.5 mm. The cavity 5 can be filled with the working medium via a channel 6. Bores 7 are provided in both the upper pressing tool 2 and the lower pressing tool 3 through which a heating and/or cooling medium can be guided.

In the configuration of the press 1 shown in FIG. 1A, a working space 8 is provided in the lower pressing tool 3 in which a workpiece (not shown in FIG. 1A) can be inserted. The two pressing tools 2, 3 have a guide 9 which can for example be formed by a protrusion 9A and a recess 9B, wherein the protrusion 9A can be provided on the lower pressing tool 3 and wherein the recess 9B can be provided on the upper pressing tool 2.

The membrane 4 is connected to the upper pressing tool 2 in the following manner: The upper pressing tool 2 has a circumferential edge element 10, which is screwed to the upper pressing tool 2 (the screw connection is not represented in FIG. 1A). A gap 11 is formed between the upper pressing tool 2 and its edge element 10 through which the membrane 4 is passed. The gap 11 opens into a hollow space 12 in which a clamping device 13 is provided in which the membrane 4 is clamped. The clamping device 13 is connected to a tension anchor 14, which is led out of the upper pressing tool 2 and the edge element 10 through an opening and is pressed outwards there by a spring 15 supporting itself on the outer surface, whereby the membrane 4 is provided with prestressing. In order to seal the cavity 5, a seal 16 is provided in the gap 11, which allows movement of the membrane 4. A device 17 for changing the sealing force $F_D$ is provided adjoining the seal 16. A device 18 for changing the spring force $F_F$ is provided adjoining the spring 15.

Figure 1B:
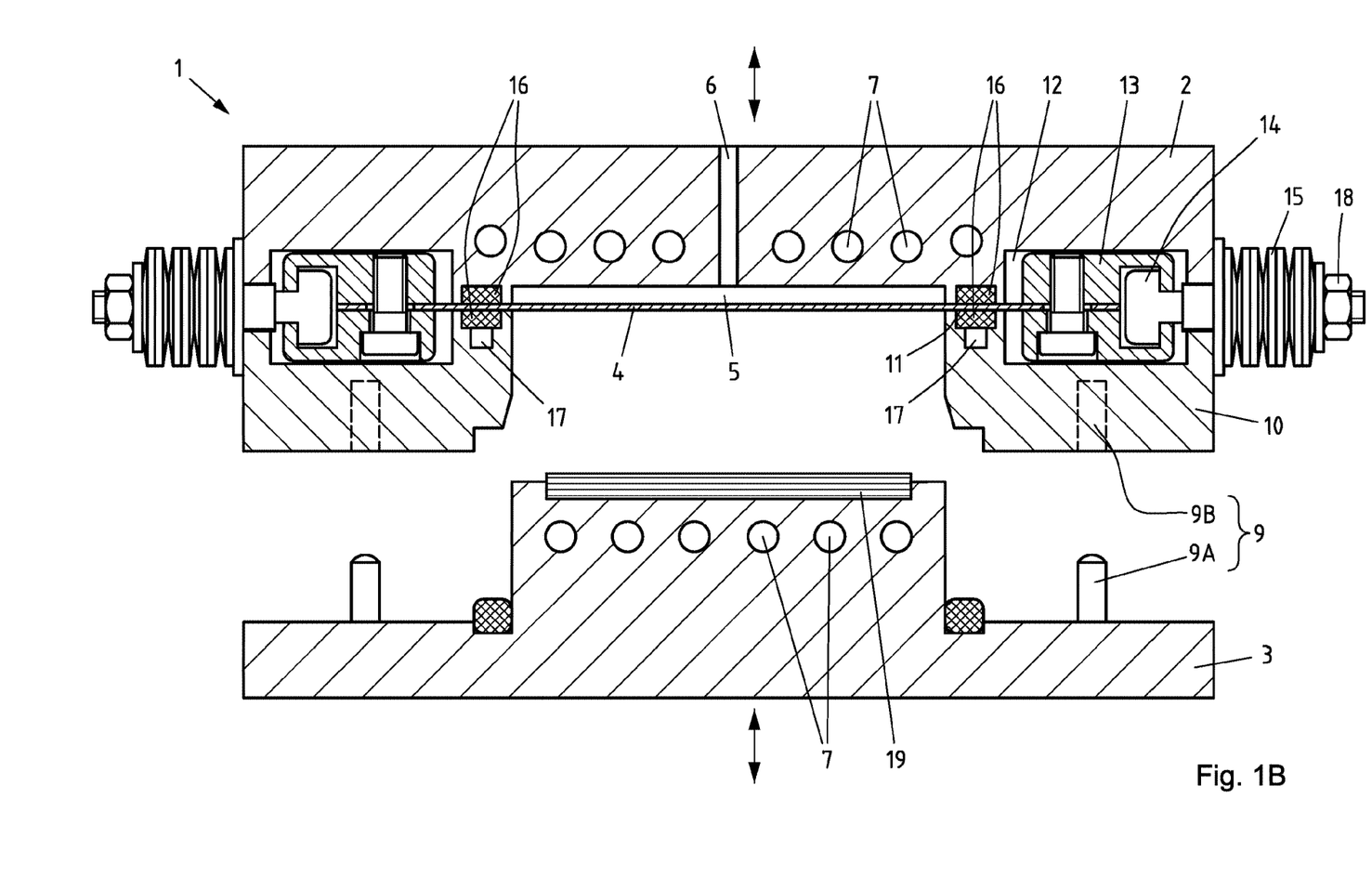
FIG. 1B: the press from FIG. 1A in open position with inserted workpiece.

FIG. 1B shows the press 1 from FIG. 1A in open position with inserted workpiece 19. The areas of the press 1 that have already been described are provided in FIG. 1B with corresponding reference numerals. The difference with the position shown in FIG. 1A is that the workpiece 19 has been inserted into the working space 8 of the lower pressing tool 3.

Figure 1C:
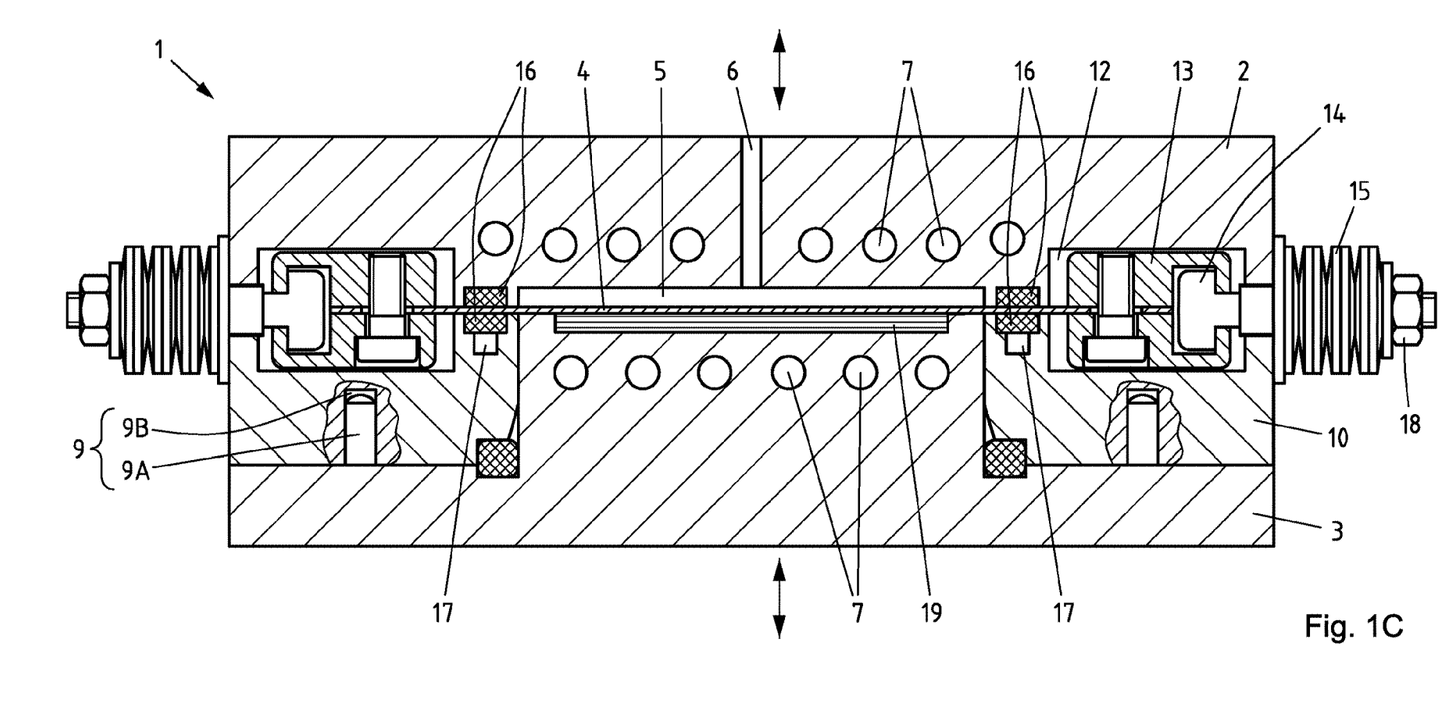
FIG. 1C: the press from FIG. 1A in closed position.

FIG. 1C shows the press 1 from FIG. 1A in closed position. The areas of the press 1 that have already been described are also provided in FIG. 1C with corresponding reference numerals. The press 1 has been closed by moving the two pressing tools 2, 3 towards one another. In the position shown in FIG. 1C, pressure and temperature are applied to the workpiece 19. Pressurisation is carried out by guiding a working medium, for example oil, through the channel 6 into the cavity 5, whereby the membrane 4 is pressed in the direction of the workpiece 19. The application of temperature can take place in different ways: One possibility is to heat the working medium guided into the cavity 5 through the channel 6 such that the heat is transferred from the working medium in the cavity 5 through the membrane 4 to the workpiece 19. Conversely, the working medium could be cooled in order to cool the workpiece 19. Alternatively or additionally to this, it can be provided that the bores 7 are flowed through by a heating and/or cooling medium, whereby first the two pressing tools 2, 3 and subsequently also the workpiece 19 can be heated or cooled. As a result of the pressure application, the workpiece 19 is compressed in the position shown in FIG. 1C.

Figure 2A:
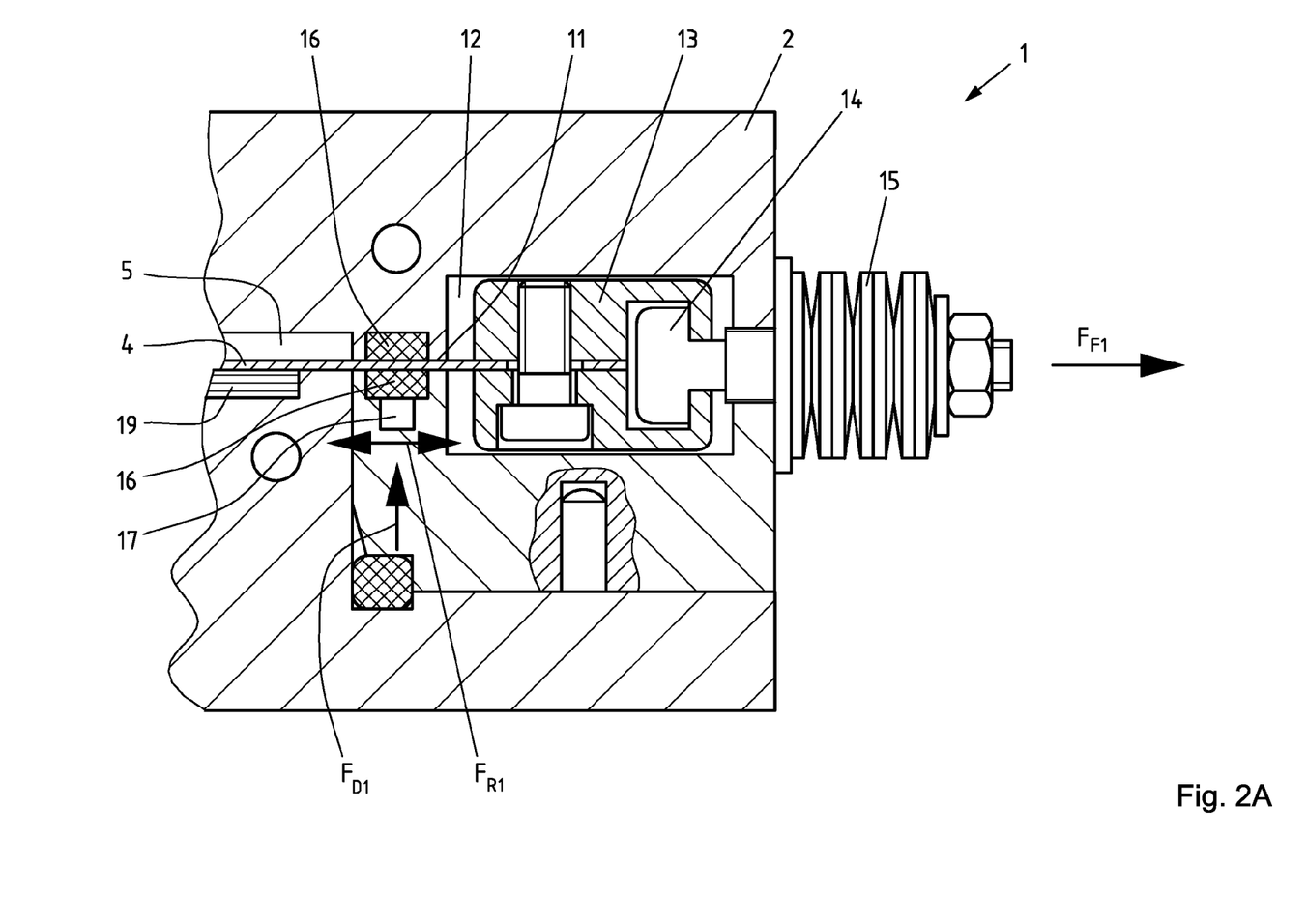
FIG. 2A: a partial area of the press from FIG. 1C in enlarged view.
Figure 2B:
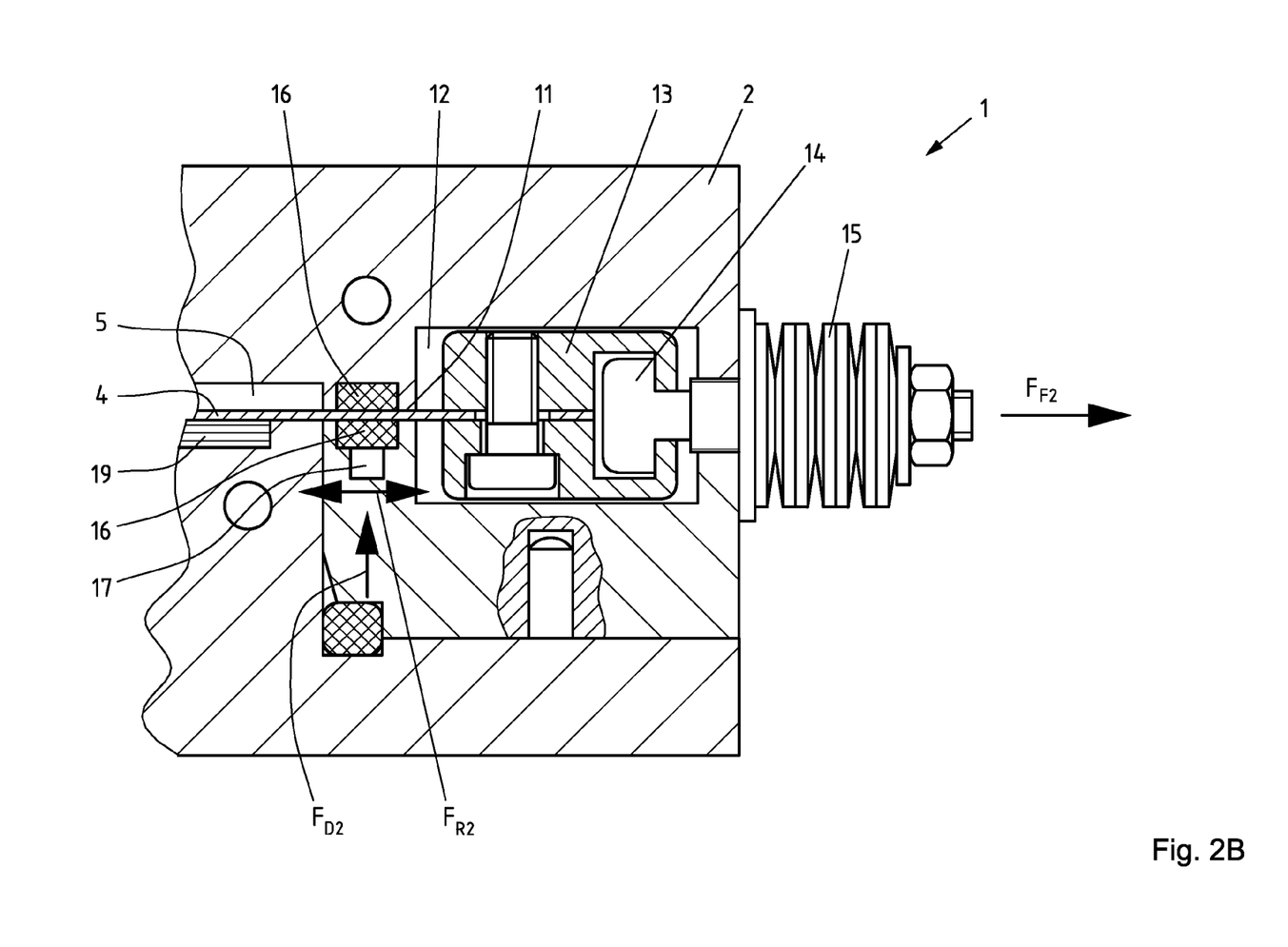
FIG. 2B: a partial area of the press from FIG. 1C in enlarged view.

FIG. 2A and FIG. 2B show a partial area of the press from FIG. 1C in enlarged view. The areas of the press 1 that have already been described are also provided in FIG. 2A and in FIG. 2B with corresponding reference numerals. In FIG. 2A and in FIG. 2B, the clamping and sealing of the membrane 4 are particularly easy to see. The cavity 5 is sealed by the seal 16 arranged in the gap 11 pressing on the membrane 4 with a sealing force $F_{D1}$ (FIG. 2A) or $F_{D2}$ (FIG. 2B). The sealing force $F_{D1}$, $F_{D2}$ acts vertically on the surface of the membrane 4, i.e. in FIG. 2A and FIG. 2B approximately in the vertical direction. The size of the sealing force $F_{D1}$, $F_{D2}$ can be changed by the device 17 for changing the sealing force. This can for example take place in that the device 17 for changing the sealing force has an actuator which presses the seal 16 onto the membrane 4 with greater or lesser force. The sealing force $F_{D1}$ represented in FIG. 2A is smaller than the sealing force $F_{D2}$ represented in FIG. 2B. For example, FIG. 2A shows the state below a certain temperature limit of the working medium in the cavity 5 (e.g. below 250° C., in particular below 200° C.) and FIG. 2B shows the state above a certain temperature limit of the working medium in cavity 5 (e.g. above 250° C.). A greater sealing force results in a more reliable seal, but restricts the mobility of the membrane 4 (even complete "locking" of the membrane 4). Conversely, a lower sealing force improves the mobility of the membrane 4, but leads to a worse seal and the associated risk of leaks. The size of the sealing force $F_{D1}$, $F_{D2}$ can therefore be set depending on the process parameters (in particular pressure and temperature in the cavity 5) to an optimum value by the device 17 for changing the sealing force.

The sealing force $F_{D1}$, $F_{D2}$ represented in FIG. 2A and FIG. 2B leads to a frictional force $F_{R1}$, $F_{R2}$ when the membrane 4 moves relative to the seal 16. The frictional force $F_{R1}$, $F_{R2}$ acts parallel to the surface of the membrane 4, i.e. in FIG. 2A and FIG. 2B approximately in the horizontal direction. In addition, the frictional force $F_{R1}$, $F_{R2}$ is always opposed to the movement of the membrane 4; since the membrane 4 can expand and contract induced by heat, the frictional force $F_{R1}$, $F_{R2}$ can thus have different directions (represented by double arrows in FIG. 2A and in FIG. 2B). The size of the frictional force $F_{R1}$, $F_{R2}$ depends on the size of the sealing force $F_{D1}$, $F_{D2}$ causing it, often within certain limits there is an approximately linear relationship (the ratio between frictional force and contact pressure is also referred to as the "friction coefficient"). Accordingly, the frictional force $F_{R1}$ represented in FIG. 2A is smaller than the frictional force $F_{R2}$ represented in FIG. 2B.

In addition, a spring force $F_{F1}$, $F_{F2}$ is represented in FIG. 2A and FIG. 2B with which the membrane 4 is prestressed. The spring force $F_{F1}$, $F_{F2}$ acts parallel to the surface of the membrane 4, i.e. in FIG. 2A and FIG. 2B approximately in the horizontal direction. The size of the spring force $F_{F1}$, $F_{F2}$ can also be set or changed by means of the device 18 for changing the spring force $F_F$. The setting or changing of the spring force $F_F$ can for example be achieved by a change in the prestressing of the spring 15. The spring force $F_{F1}$ (FIG. 2A) is approximately the same size as the spring force $F_{F2}$ (FIG. 2B).

Figure 3A:
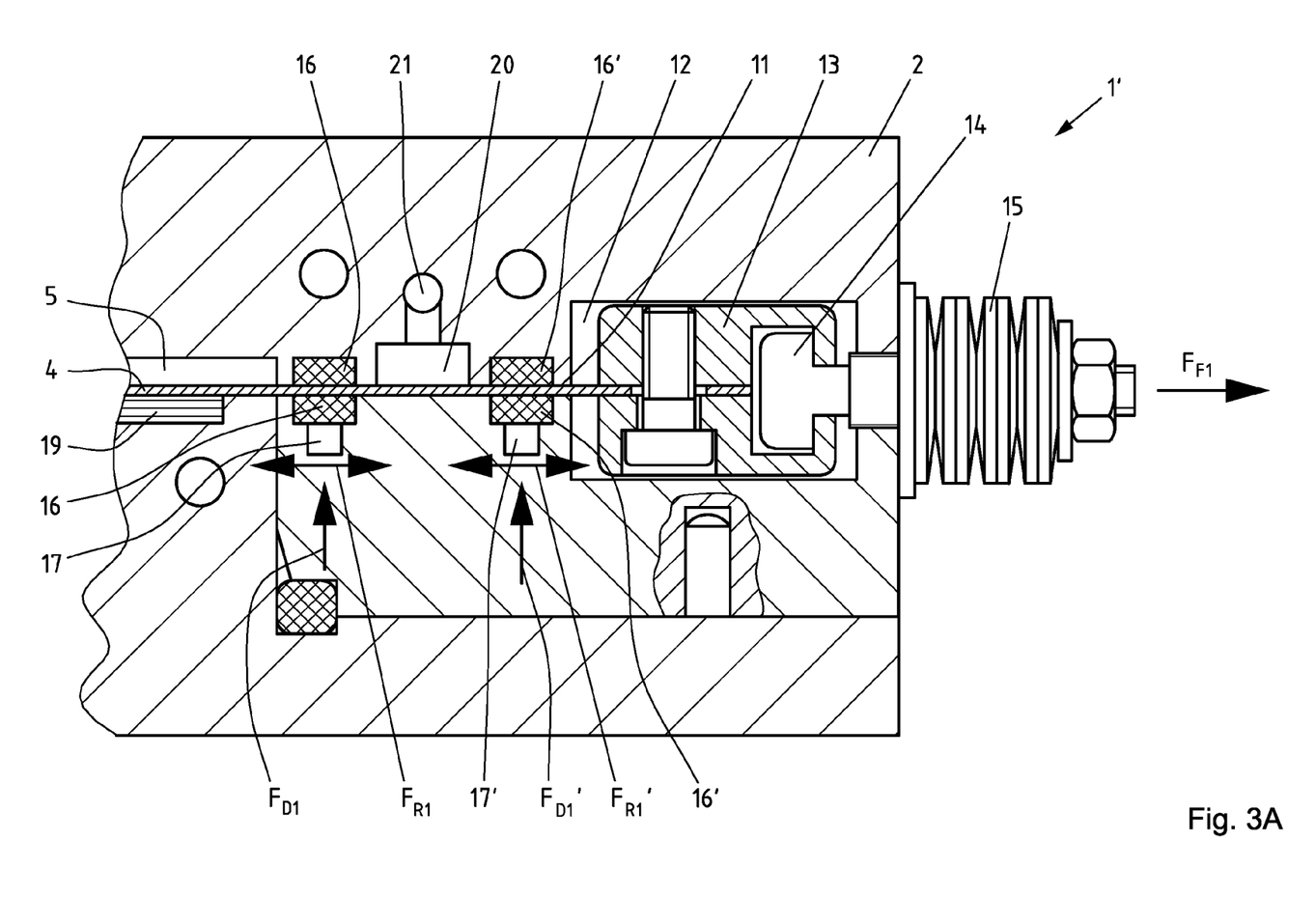
FIG. 3A: a partial area of a second configuration of a press for carrying out a method according to the invention in enlarged view.
Figure 3B:
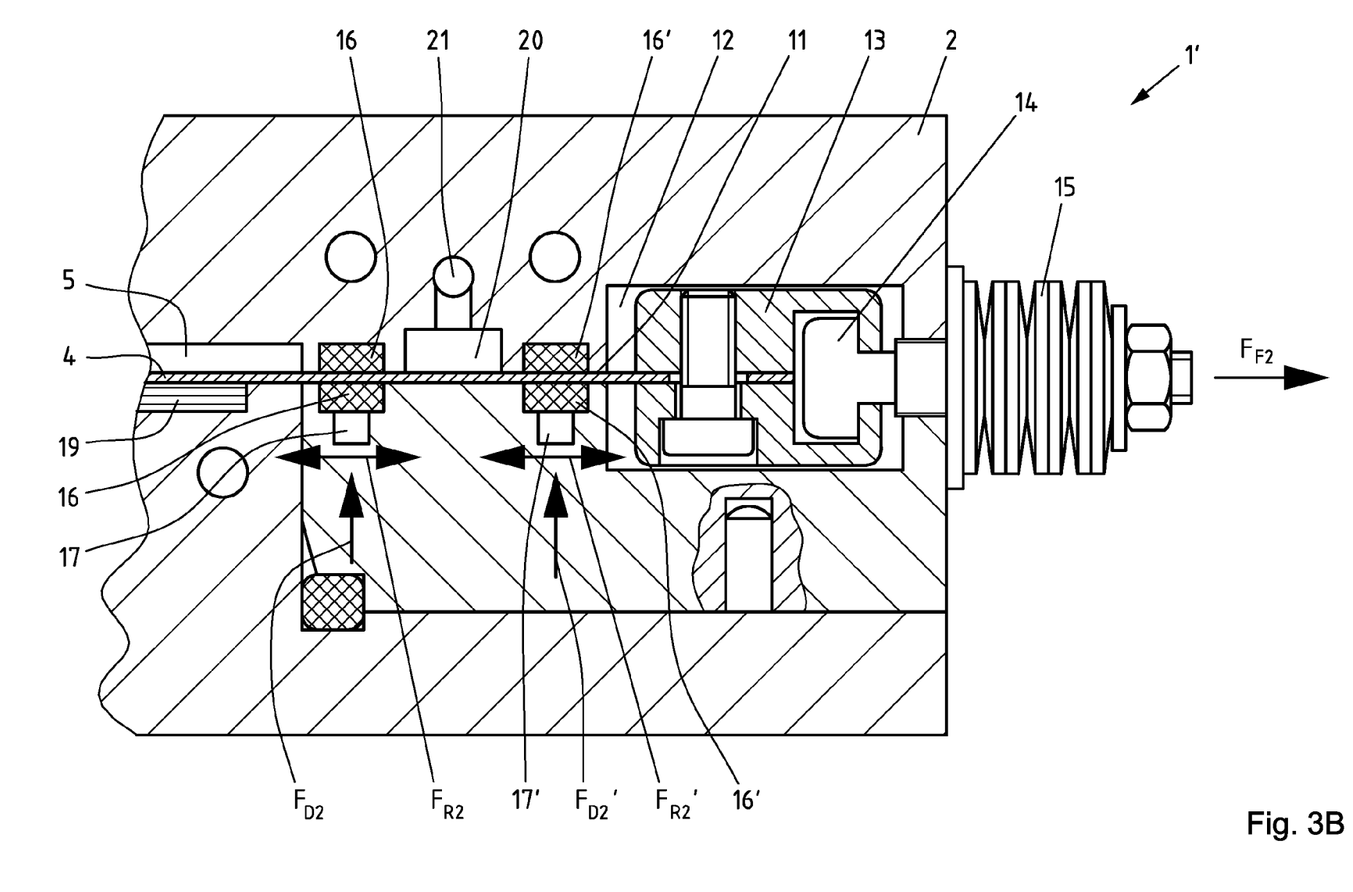
FIG. 3B: a partial area of a second configuration of a press for carrying out a method according to the invention in an enlarged view.

FIG. 3A and FIG. 3B show a partial area of a second configuration of a press 1' for carrying out a method according to the invention in an enlarged view. The areas of the press 1' that have already been described are also provided in FIG. 3A and in FIG. 3B with corresponding reference numerals. The main difference to the previously shown and described press 1 is that the press 1' shown in FIG. 3A and FIG. 3B, in addition to the first seal 16, has a second seal 16', which is also arranged in the region of the gap 11 in order to act on the membrane 4 there. The second seal 16' is also provided with a device 17' for changing the sealing force $F_D$ with which the sealing force $F_{D1}'$, $F_{D2}'$ can be changed on the second seal 16' in the manner already described. The sealing force $F_{D1}'$, $F_{D2}'$ represented in FIG. 3A and FIG. 3B leads to a frictional force $F_{R1}'$, $F_{R2}'$ when the membrane 4 moves relative to the seal 16'. The frictional force $F_{R1}'$, $F_{R2}'$ also acts on the second seal 16' parallel to the surface of the membrane 4, i.e. in FIG. 3A and FIG. 3B approximately in the horizontal direction. In addition, the frictional force $F_{R1}'$, $F_{R2}'$ is always opposed to the movement of the membrane 4; since the membrane 4 can expand and contract induced by heat, the frictional force $F_{R1}'$, $F_{R2}'$ can thus have different directions (represented in FIG. 3A and in FIG. 3B by double arrows). The size of the frictional force $F_{R1}'$, $F_{R2}'$ depends on the size of the sealing force $F_{D1}$, $F_{D2}$ causing it, often within certain limits there is an approximately linear relationship (the ratio between frictional force and contact pressure is also referred to as the "friction coefficient"). Accordingly, the frictional force $F_{R1}'$ represented in FIG. 3A is smaller than the frictional force $F_{R2}'$ represented in FIG. 3B.

In FIG. 3A and FIG. 3B, a hollow space 20 is also discernible, which is arranged in the gap 11 between the two seals 16, 16'. The hollow space serves to collect working medium escaping from the cavity 5 in the event of a leak of the first seal 16 and to drain it through an outlet 21. In this way, a slight leak of the first seal 16 can be accepted. This makes it possible to set the sealing force $F_{D1}, F_{D2}$ on the first seal 16 so low that the frictional force $F_{R1}, F_{R2}$ occurring there is low and the membrane 4 can move as well as possible relative to the first seal 16, in particular can expand and contract induced by heat. A complete sealing of the press 1' is then carried out by the second seal 16', which can also be set due to the pressure difference or the pressure drop between the first seal 16 and the second seal 16' such that the sealing force $F_{D1}', F_{D2}'$ occurring there and the frictional force $F_{R1}', F_{R2}'$ caused thereby are so low that the membrane 4 can also move as well as possible relative to the second seal 16' and no locking or jamming of the membrane 4 is to be feared.

Figure 4:
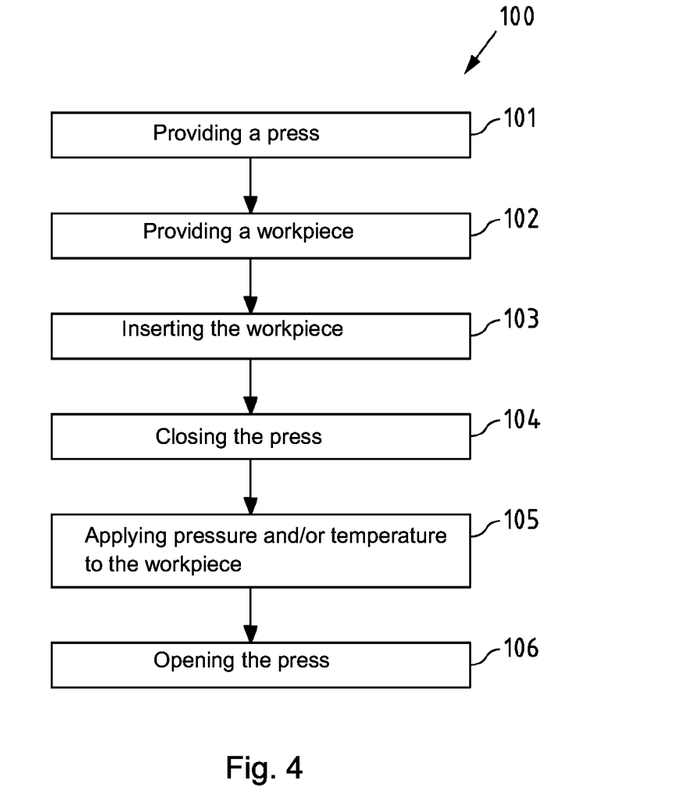
FIG. 4: the sequence of a method according to the invention in schematic representation.

FIG. 4 lastly shows the sequence of a method 100 according to the invention in a schematic representation. The method 100 comprises the following steps: 101: Providing a press, 102: Providing a workpiece, 103: Inserting the workpiece, 104: Closing the press, 105: Applying pressure and/or temperature to the workpiece, 106: Opening the press.

LIST OF REFERENCE NUMERALS 1, 1': Press
2: First (upper) pressing tool
3: Second (lower) pressing tool
4: Membrane
5: Cavity
6: Channel
7: Bore
8: Working space
9: Guide
9A: Protrusion
9B: Recess
10: Edge element
11: Gap
12: Hollow space
13: Clamping device
14: Tension anchor
15: Spring
16, 16': Seal
17, 17': Device (for changing the sealing force $F_D$)
18: Device (for changing the spring force $F_F$)
19: Workpiece
20: Hollow space
21: Outlet
$F_{D1}, F_{D2}$: Sealing force (of the seal 16)
$F_{D1}', F_{D2}'$: Sealing force (of the seal 16')
$F_{R1}, F_{R2}$: Frictional force (of the seal 16)
$F_{R1}', F_{R2}'$: Frictional force (of the seal 16')
$F_{F1}, F_{F2}$: Spring force (of the spring 15)

The invention claimed is:

1. A method for manufacturing a moulded part using a press, comprising the following steps:
a) providing the press, the press comprising:
   a first pressing tool,
   a second pressing tool, and
   a membrane,
      wherein the first pressing tool and the second pressing tool can be moved relative to one another,
      wherein the membrane is connected to one of the pressing tools,
      wherein a cavity for holding a working medium is formed between the membrane and the pressing tool connected to it, and
      wherein the cavity is sealed by at least one seal which presses on the membrane with a sealing force,
b) providing at least one workpiece,
c) inserting the workpiece at least partially into a working space at least partially defined within the first pressing tool or the second pressing tool and the workpiece at least partially contacting the working space,
d) closing the press,
e) applying pressure and/or temperature to the workpiece through the membrane, wherein a hardened moulded part is formed from the workpiece, and
f) opening the press and removing the moulded part,
   wherein the membrane is already prestressed before step e),
   wherein the sealing force is changed during step e), and the workpiece has a matrix and fibers inserted therein.

2. The method according to claim 1, wherein during step e) the pressure and/or the temperature of the working medium in the cavity are changed.

3. The method according to claim 1, wherein in step e), the pressure of the working medium in the cavity is increased to a pressure in the range between 5 bar and 50 bar.

4. The method according to claim 1, wherein in step e), the temperature of the working medium in the cavity is increased to a temperature in the range between 300° C. and 500° C.

5. The method according to claim 1, wherein the sealing force is changed during step e) by an actuator acting on the seal.

6. The method according to claim 1, wherein the sealing force is changed depending on the pressure and/or the temperature of the working medium in the cavity.

7. The method according to claim 1, wherein at least one first sealing force and one second sealing force different thereto is set.

8. The method according to claim 1, wherein the membrane is manufactured from metal and has a thickness in the range between 0.05 mm and 0.5 mm.

9. The press for carrying out the method according to claim 1, the press comprising:
a first pressing tool,
a second pressing tool, and
a membrane,
   wherein the first pressing tool and the second pressing tool can be moved relative to one another,
   wherein the membrane is connected to one of the pressing tools,
   wherein a cavity for holding a working medium is formed between the membrane and the pressing tool connected to it,
   wherein the cavity is sealed by at least one seal which presses on the membrane with a sealing force,
   wherein at least one device for changing the prestressing of the membrane is provided, and wherein at least one device for changing the sealing force of the seal, comprising an actuator acting on the seal.

10. The method according to claim 1, wherein in step e), the pressure of the working medium in the cavity is increased to a pressure in the range between 15 bar and 30 bar.

11. The method according to claim 1, wherein in step e), the temperature of the working medium in the cavity is increased to a temperature in the range between 350° C. and 410° C.

12. The method according to claim 1, wherein the sealing force is changed during step e) by a device for changing the sealing force.

13. The method according to claim 1, wherein at least one first sealing force and one second sealing force, the one second sealing force greater than the first sealing force, is set.

14. The method according to claim 1, wherein the membrane is manufactured from metal and has a thickness in the range between 0.25 mm and 0.4 mm.

* * * * *